United States Patent [19]
Jonsson et al.

[11] Patent Number: 4,985,826
[45] Date of Patent: Jan. 15, 1991

[54] METHOD AND DEVICE TO EXECUTE TWO INSTRUCTION SEQUENCES IN AN ORDER DETERMINED IN ADVANCE

[75] Inventors: Björn E. R. Jonsson, Järfälla; Sten E. Johnson, Huddinge; Lars-Örjan Kling, Södertälje; Oleg Avsan, Huddinge, all of Sweden

[73] Assignee: Telefonaktiebolaget L. M. Ericsson, Stockholm, Sweden

[21] Appl. No.: 192,512
[22] PCT Filed: Sep. 28, 1987
[86] PCT No.: PCT/SE87/00438
§ 371 Date: May 10, 1988
§ 102(e) Date: May 10, 1988
[87] PCT Pub. No.: WO88/02514
PCT Pub. Date: Apr. 7, 1988

[30] Foreign Application Priority Data
Oct. 3, 1986 [SE] Sweden ............... 8604222

[51] Int. Cl.$^5$ ............................................. G06F 9/38
[52] U.S. Cl. ................................. 364/200; 364/262.4; 364/263
[58] Field of Search ... 364/200 MS File, 900 MS File; 371/12

[56] References Cited

U.S. PATENT DOCUMENTS

| | | | |
|---|---|---|---|
| 3,787,673 | 1/1974 | Watson et al. | 364/200 |
| 3,967,248 | 6/1976 | Kjoller et al. | 364/200 |
| 3,969,702 | 7/1976 | Tessera | 340/172.5 |
| 4,075,694 | 2/1978 | Ericsson | 364/200 |
| 4,466,061 | 8/1984 | DeSantis et al. | 364/200 |
| 4,626,989 | 12/1986 | Torii | 364/200 |
| 4,703,481 | 10/1987 | Fremont | 364/200 X |
| 4,720,779 | 1/1988 | Reynard et al. | 364/200 |
| 4,841,432 | 2/1969 | Kishi et al. | 364/900 X |

FOREIGN PATENT DOCUMENTS

| | | |
|---|---|---|
| 1218656 | 3/1968 | United Kingdom. |
| 1441458 | 6/1978 | United Kingdom. |

OTHER PUBLICATIONS

Granberg, APZ150: A Multiprocessor System for the Control of Transit Telephone Exchanges, 1976, pp. 287–308.
"Balance 8000 Technical Summary", Chapter 1–Introduction pp. 1–17 dated Dec. 11, 1985.
"Backup Support Gives VME Bus Powerful Multi–Processing Architecture" Electronics, Mar. 22, 1984, pp. 132–138.
"Supercomputer Expands Parallel Processing Options", Computer Design, Aug. 15, 1985, pp. 76–81.

*Primary Examiner*—Raulfe B. Zache
*Attorney, Agent, or Firm*—Burns, Doane, Swecker & Mathis

[57] ABSTRACT

A data processing system executes two instruction sequences in an order determined in advance. Each sequence is stored in a separate memory. Data information used in the second sequence is not guaranteed to be independent of data information used in the first sequence. Increased data handling capacity is achieved in the following manmner: both sequences are initially executed in parallel. An address included in a read instruction associated with the second sequence is intermediately stored in an auxiliary memory if it has not been previously selected in conjunction with a write instruction of the second sequence. The intermediately stored address is compared with the write addresses of the first sequence and execution of the second sequence is restarted upon detection of a match.

6 Claims, 3 Drawing Sheets

METHOD AND DEVICE TO EXECUTE TWO INSTRUCTION SEQUENCES IN AN ORDER DETERMINED IN ADVANCE

FIELD OF THE INVENTION

The present invention relates to a method and a device to execute two instruction sequences in an order determined in advance, the execution of the first and the second sequence, respectively, including selection of read instructions each containing its read address for retrieval of data information stored in one of a plurality of memory locations each accessible by its address in a first and a second separate memory respectively, as well as selection of write instructions each containing its write address and data information for transfering this data information to a separate memory location assigned to the respective sequence and accessible by the write address, the separate memory locations of the sequences being mutually updated with regard to the order and with regard to the selected write instructions, and the data information used in conjunction with the execution of the sequence which is second due to the order not being guaranteed in advance independent of the data information obtained in conjunction with the execution of the sequence which is first due to the order.

DESCRIPTION OF THE RELATED ART

A trivial, conventional solution of the above mentioned information handling problem resides in that the execution of the second sequence, is not started until the execution of the first sequence, is terminated. This trivial solution is obtained as a natural necessity in a data processing system controlled by a single processor such that the sequences are executed one at a time using main memory locations common to both sequences.

It is known to increase data processing capacity by parallel execution of the instruction sequences. As long as the sequences are guaranteed in advance to be mutually independent, fault-free parallel operation is achieved with the aid of so-called pre-processing or multi-processing, or also with the aid of a one-processor processor system which includes at least two data processing units, each of which executes its instruction sequence. It is known to realise information handling both by means of a main memory which is common to a plurality of data processing units and by means of a plurality of separate memories each associated with its data processing unit and mutually updated from time to time.

When there are sensitive instruction sequences which affect each other, and which must therefore be executed in a prescribed order, there is used e.g. according to the journal "Computer Design", Aug. 15, 1985, pp 76–81" or "Balance 8000 System Technical Summary, Sequent Computer Systems, Inc" programming languages, compilators and sequence hardware for parallel processing of mutually independent sequences while parallel processing of the sensitive sequences is prevented.

SUMMARY OF THE INVENTION

As already mentioned in the introduction, the present invention relates to data information processing using two separate memories, each assigned to one sequence. In the proposed information processing, both sequences are executed in parallel without regard to the order determined in advance. The dependence of the second sequence on the first sequence is monitored and the prescribed order is achieved with the aid of an intermiediate storage unit which includes an auxiliary memory and at least one comparison circuit.

Addresses obtained due to read instructions selected during execution of the second sequence are intermediately stored in the auxiliary memory. Every write address selected during the execution of the first sequence is compared with each of the read addresses stored in the auxiliary memory. As long as no duplication of address is determined, no data information dependent on data information obtained during the execution of the first sequence is used during the execution of the second sequence. If it occurs during execution of the second sequence that information has been retrieved from the separate memory location associated with the second sequence, and this information is then corrected by a write operation associated with the first sequence, i.e. if the two sequences are no longer mutually independent, the auxiliary memory is erased and the instruction selections of the second sequence are started once again. Restarting execution of the second sequence then takes place at a time when a first part of the first sequence is already executed, and consequently there is less risk of the second sequence being dependent on the remaining part of the first sequence.

Write addresses and data information obtained on the basis of write instructions selected during execution of the second sequence are also stored in the auxiliary memory for facilitating updating of the separate memory associated with the first sequence.

In using the proposed information handling there is obtained an increase in the data processing capacity, if the execution of the second sequence is independent of at least the instructions selected at the execution termination of the first sequence. The increased capacity is further improved if a selected address is intermediately stored as a read address in the auxiliary memory solely if this address has not been present as a write address earlier during execution of the second sequence, and is further improved if the separate memory assigned to the second sequence is updated in steps in conjunction with every write instruction selected during the execution of the first sequence.

The characterizing features of the invention are apparent from the claims.

BRIEF DESCRIPTION OF THE DRAWINGS

The invention will now be described in detail below and with reference to the accompanying drawing.

DETAILED DESCRIPTION OF THE PREFERRED EMBODIMENT

Figure 1:
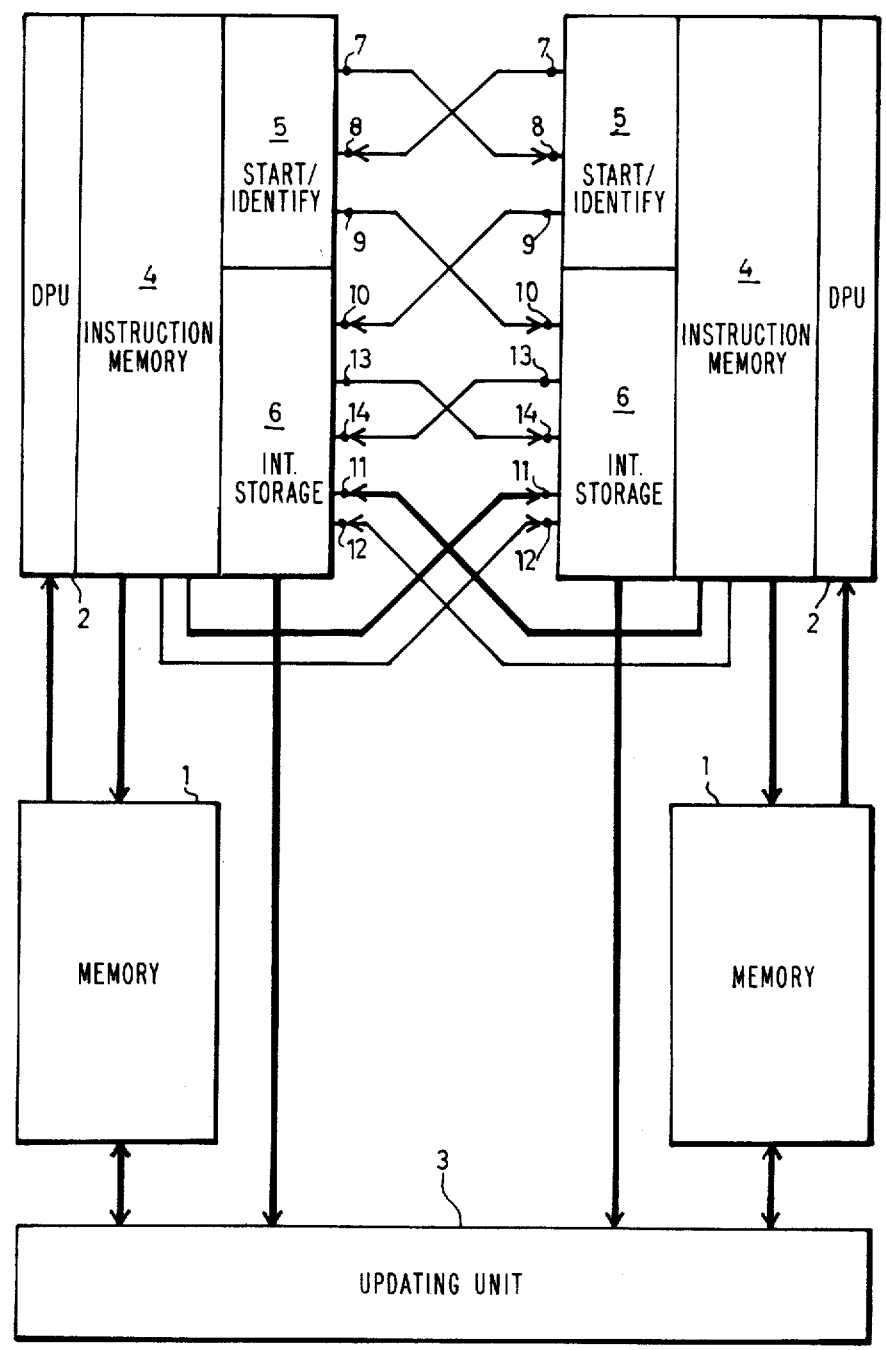
FIG. 1 illustrates two data processing units which are each connected to its separate memory and an updating unit.

A data processing system according to FIG. 1 includes two separate memories 1 for storing data information, which is processed by at least two data processing units 2, which are each connected to its separate memory. Each of the data processing units executes an instruction sequence for controlling assigned functional units (not illustrated in FIG. 1) in carrying out assigned system functions. Depending on whether the data processing units are controlled by a common processor or whether each unit includes a plurality of processors, there is conventionally obtained in principle a one- or multiprocessor system in which the instruction sequences are executed, to start with, by means of the separate memory of the local sequence, in which system however each data processing unit orders an updating unit 3 to update the remaining separate memories of the system with regard to the order and to the executed write instructions. Such a data processing system including a plurality of data processing units and associated separate memories which are mutually updated from time to time, is described in the art, e.g. in S-E Granberg's article "APZ 150: A multiprocessor system for the control of transit telephone exchanges" published in 1976 by Infotech International Ltd, Nicholson House, Maidenhead, Berkshire, England.

FIG. 1 illustrates in a greatly simplified way, taking into account the present invention, two data processing units 2 for executing the above mentioned first and second instruction sequences in an order determined in advance. Apart from a conventional instruction memory device 4 for selecting, one at a time, instructions stored in an instruction memory, each data processing unit includes a start/identifying circuit 5, for stating whether its own sequence is the first independent or the second possibly dependent sequence, and an intermediate storage unit 6. With the aid of the intermediate storage units, the data processing units 2 control the updating of the separate memories, and thereby the execution of the sequences in the order determined in advance. The intermediate storage unit, the data processing unit of which executes the second sequence, intermediately stores addresses included in the instructions and thus monitors the dependence of the second sequence on the first sequence.

It is indicated that data information is transferred partly due to write instructions from the instruction memory devices to the associated separate memories, and partly due to read instructions from the separate memories to the associated data processing units.

The start/identifying circuits 5 of the data processing units are each provided with a starting signal output 7 which is connected to a starting signal input 8 of the other circuit 5. There is thus indicated the possibility of executing both sequences in parallel, that is described hereinafter and used in the proposed information handling.

The start/identifying circuits 5 are each provided with an identifying signal output 9, which is connected to a first identifying signal input 10 on the intermediate storage unit 6 of the other data processing unit. The intermediate storage unit of each of the data processing units is provided with an address input 11 and a write marking input 12 for receiving write addresses selected from the instruction memory device 4 of the other data processing unit. The intermediate storage units 6 are mutually connected via an updating output 13 and an updating input 14.

Figure 2:
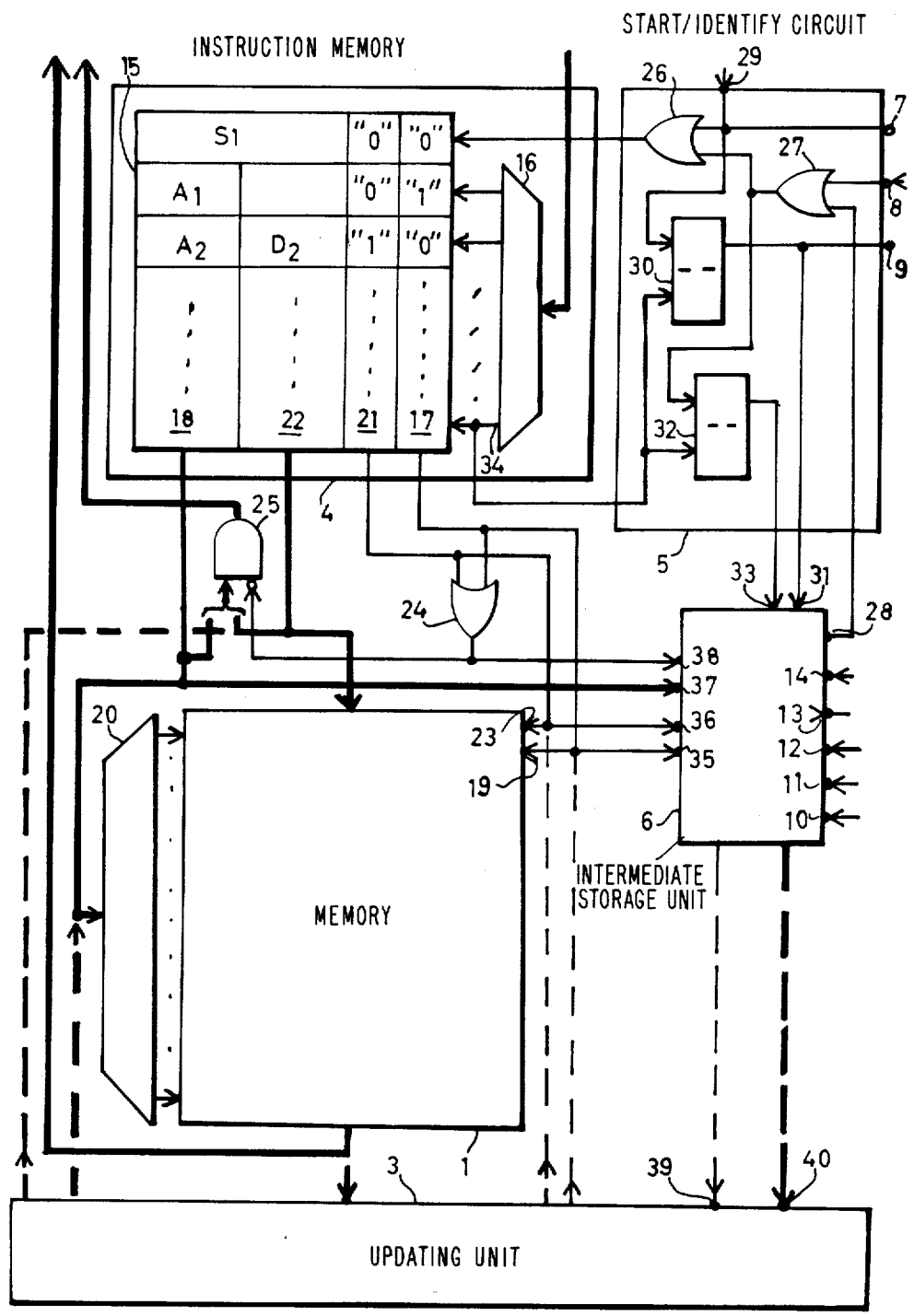
FIG. 2 illustrates in more detail than FIG. 1 the activation of a separate memory for reading, writing and updating, as well as an instruction memory device, and a circuit for starting and identifying, which are included in a data processing unit.

FIG. 2 illustrates in more detail than FIG. 1 some data processing unit details, knowledge of which is required for understanding the proposed information handling.

The instruction memory device 4 includes an instruction memory 15 for storing an instruction sequence, which is read out with the aid of a selection device 16 from the instruction memory, one instruction at a time, due to activation by one of the selection device outputs.

The sequence includes three instruction types. The first type, hereinafter designated "read instruction", which is identified by a binary ONE set read bit position 17, is used for ordering the retrieval of data from a location of the separate memory 1 connected to the instruction memory, access to the separate memory being obtained with the aid of an address, e.g. A1, stored in a number of address bit positions 18, the address being included in the read bit marked instruction. The read bit positions 17 and the address bit positions 18 are respectively connected to a read activating input 19 and an addressing circuit 20 of the separate memory.

The second instruction type, hereinafter designated "write instruction", which is identified by a ONE set write bit position 21, is used for ordering that data, e.g. D2, is written into a separate memory location, this data being included in the write bit marked instruction and stored in a number of data bit positions 22, while using an address, e.g. A2, which is also included in the write bit marked instruction and stored in the address bit positions 18. The write bit positions 21 are connected to a write activating input 23 of the separate memory.

The third instruction type, which is identified by ZERO set bit positions 17 and 21, is used for ordering information handling without reading from or writing into the separate memory. The use of the information, e.g. S1, stored in the bit positions 18 and 22, which are associated with a third type of instruction, are not within the scope of the invention, but FIG. 2 illustrates a first OR gate 24, with its inputs connected to the bit positions 17 and 21 and its output connected to an inverting activating input of a first AND gate device 25, which in an activated state transfers the contents, e.g. S1, of the bit positions 18 and 22 directly to the data processing unit.

The start/identifying circuits 5 of the data processing units each include second and third OR gates 26 and 27, according to FIG. 2. Gate 26 has one of its inputs connected to the output of the gate 27, the inputs of which are connected to the above-mentioned starting signal input 8 and to a restarting signal output 28 of the intermediate storage unit 6 included in the same data processing unit. The data processing units each include a starting signal generator, not illustrated in FIG. 2, the output of which is connected via a starting terminal 29 to the other input of gate 26, to the above-mentioned starting signal output 7 and to the setting input of a first flipflop 30, with an output constituting the above-mentioned identifying signal output 9 which is connected to a second identifying signal input 31 on the local intermediate storage unit 6. A second flipflop 32 has its setting input connected to the output of gate 27 and its output connected to a third identifying signal input 33 on the local intermediate storage unit 6. In its activated state the gate 26 selects an instruction of the third type, which is a starting instruction with the contents S1, due to which the data processing unit starts the associated instruction sequence execution with the aid of its selection device 16. It is assumed that the sequence stored in the instruction memory 15 is terminated in conjunction with the activation of a selection device output 34, which is connected to the resetting inputs of the flipflops 30 and 32.

Execution of the first sequence is started by the local starting signal generator. Consequently, a binary ONE on the output of the first flipflop 30 indicates that the instruction selections associated with the local sequence are in progress and that the local sequence is the first sequence. A binary ONE on the output of the second flipflop 32 indicates that the instruction selections associated with the local sequence are in progress and that the local sequence is the second sequence. In accordance with the invention, the instructions of both sequences are selected in parallel, which is achieved e.g. by a starting signal transfer from the starting signal output 7 associated with the first sequence to the starting signal input 8 associated with the second sequence.

The read addresses and write addresses selected from the instruction memory 15 are transferred via terminals 35-37 to the intermediate memory unit 6 of the data processsing unit. FIG. 2 illustrates the above-mentioned identifying signal input 10 and write address inputs 11-12 of the intermediate storage unit, and a first control terminal 38, which is connected to the output of the first OR gate 24.

Finally, conventional updating functions are indicated in FIG. 2 with the aid of dashed communication lines. The updating unit 3 is provided with order terminals 39 and 40. Updating order signals and updating addresses are sent in parallel via the terminals 39 and 40, respectively. Due to an updating order obtained from one of the intermediate storage units, the updating unit transfers the order signal to the local separate memory read activating input 19 and to the write activating input 23 of the other separate memory, and the updating unit transfers the address associated with the updating order to the addressing circuits 20 of the separate memories. There is thus obtained a data transfer from the local separate memory via the updating unit to the other separate memory.

Figure 3:
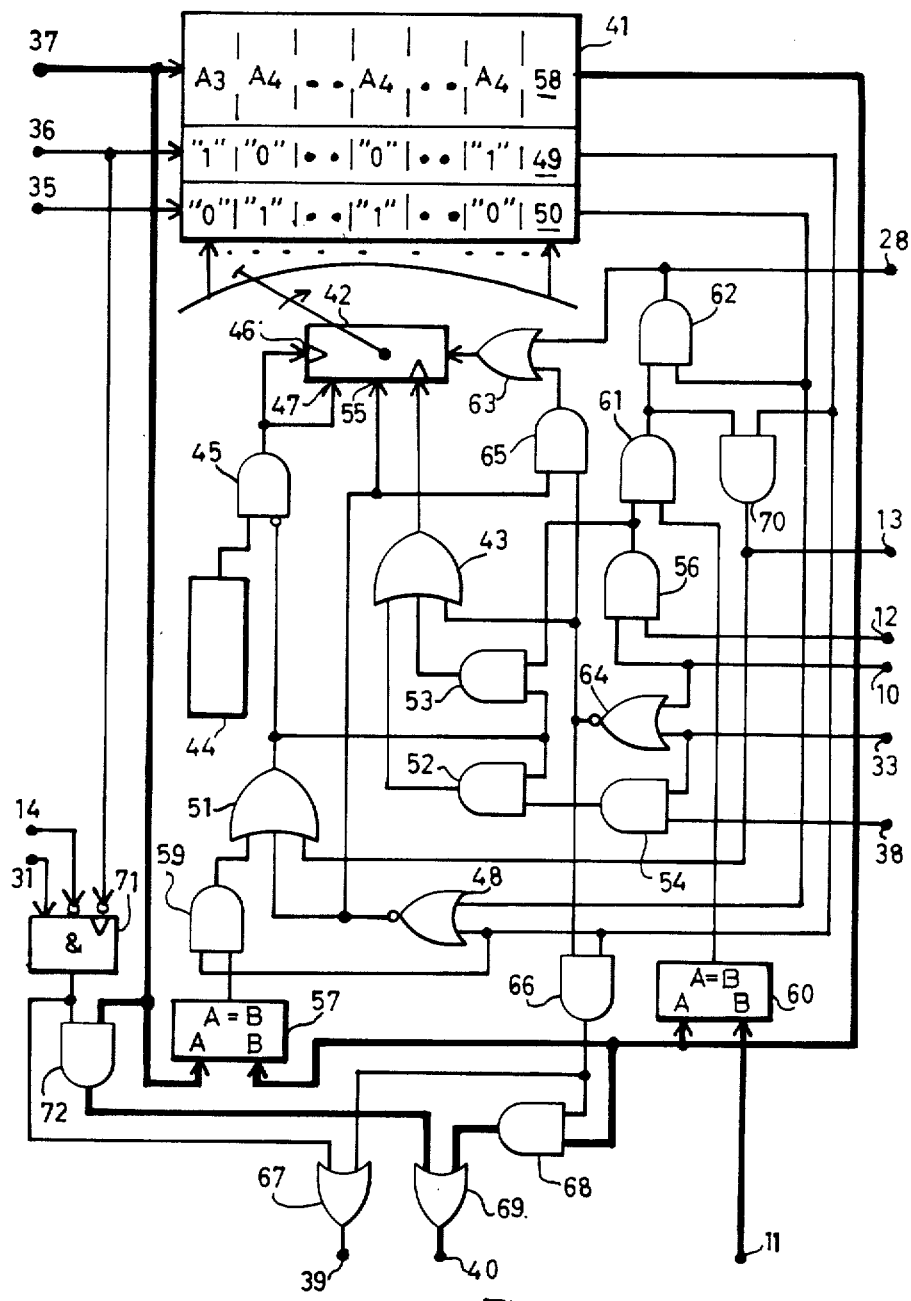
FIG. 3 illustrates an intermediate storage unit included in a data processing unit.

FIG. 3 illustrates an intermediate storage unit which includes an auxiliary memory 41. The latter has columns for intermediate-storing of read addresses and write addresses transferred via the terminals 35-37, the columns being selected for writing, reading and erasure with the aid of a scanning device 42. It will be later described how the auxiliary memory is erased when the associated instruction sequence is finally executed.

The front edge of a scanning pulse sent from a fourth OR gate 43 sets the scanning device to zero. Access to the auxiliary memory columns is obtained by the front edges of stepping pulses which are generated by a stepping generator 44 and transferred via an activated stepping AND gate 45 to a stepping terminal 46 of the scanning device. The stepping pulses are also sent to a read activating terminal 47, resulting in the column contents being read one at a time.

The intermediate storage unit according to FIG. 3 includes a first NOR gate 48, with its inputs adapted for receiving the write markings and read markings intermediately stored in write bit positions 19 and read bit positions 50 of the auxiliary memory, and with its inverting output connected via a stop OR gate 51 to an inverting input of the stepping AND gate 45 and to first inputs of a first and a second AND control gate 52 and 53, the outputs of which are connected to the OR gate 43. The control gate 52 has its second input connected to a third AND control gate 54, the inputs of which are connected to the above mentioned identifying signal input 33 and control terminal 38.

Consequently, scanning pulses are only generated in the intermediate storage unit included in the data processing unit executing the second sequence. A scanning operation is ordered upon selection of a read instruction or a write instruction. A stop in stepping is obtained when an unoccupied column is read, i.e. a column which is neither write marked or read marked. A condition for starting scanning is that the preceding stepping has been stopped.

The first NOR gate 48 is connected to a write activating input 55 of the scanning device. It is assumed that a write instruction with associated address A3 and a read instruction with associated address A4 constitute the first and second instructions of the second sequence directed towards the associated separate memory, the write/read addresses of these instructions being intermediately stored in the described way in the first and second columns of the auxiliary memory, these columns having bit positions 49 and 50, which were set to zero prior to respective storage.

The control gate 53 has its second input connected to a fourth AND control gate 56, with the first input connected to the above-mentioned first identifying input 10, and with the second input connected via the above mentioned write marking input 12 to the write bit positions 21 in the instruction memory 15 which stores the first sequence. A scanning operation is thus also ordered for the second sequence intermediate storage unit upon selecting a write instruction associated with the first sequence. The timing frequency of the stepping generator 44 is assumed to be sufficiently high in relation to the instruction selection speed that all the scanning operations ordered via the control gates 54 and 56 have time to be carried out.

The intermediate storage unit includes a first comparison circuit 57, the output of which is activated when the address obtained via terminal 37 from the instruction memory 15 is the same as one of the addresses read from the auxiliary memory address bit positions 58 during a scanning operation. A fifth AND control gate 59 has its output connected to stop OR gate 51, its first input connected to comparison circuit 57 and its second input disposed for receiving the write markings intermediately stored in the auxiliary memory write bit positions 49. There is thus obtained that a scanning operation is stopped if a read address or write address selected from the instruction memory agrees with an intermediately stored write address.

It is assumed that the selection of the read instruction with associated address A4 is repeated a first time after selection of a number of instructions (not illustrated in FIG. 3) with addresses other than A3 and A4. There is obtained that the selection repeated a first time does not result in a scanning stop due to address duplication determined by the first comparison circuit 57, so that the read instruction repeated a first time is intermediately stored a second time in a column whose bit positions 49 and 50 were previously set to ZERO. The second sequence read instructions with associated address Ax are called first category instructions if they are selected before the same address Ax is present in the second sequence in conjunction with the selection of a write instruction.

It is assumed that a write instruction with associated address A4 is selected after selection of the above mentioned read instruction is repeated for the first time and after selection of a number of instructions (not illustrated in FIG. 3) with addresses other than A3 and A4.

There is thus obtained that this write instruction is intermediately stored in a previously unoccupied column. It is further assumed that selection of the read instruction with associated address A4 is repeated a second time after selection of the mentioned write instruction with the address A4. There is obtained a scanning stop in conjunction upon reading the intermediately stored write instruction with the address A4, but no read marking is carried out in bit position 50. The read instruction with associated address A4 repeated a second time constitutes a second category instruction, whose associated address is not intermediately stored in the auxiliary memory.

The intermediate storage unit of one of the data processing units includes a second comparison circuit 60, in the output of which is activated on duplication between the address transferred via the above-mentioned address input 11, this address being selected from the address bit positions 18 included in the instruction memory 15 of the other data processing unit, and one of the addresses read from the address bit positions 58 of the auxiliary memory during a scanning operation. The second comparison circuit is connected to the first input of a sixth AND control gate 61, the second input of which is connected to the above-mentioned control gate 56, and the output of which is connected to a first input of a seventh AND control gate 62. The output of the control gate 62 which receives on its second input the read markings intermediately stored in the auxiliary memory bit positions 50, constitutes the above-mentioned restarting signal output 28 and is connected to an erase OR gate 63. The OR gate 27 illustrated in FIG. 2 receives a restarting signal from an activated control gate 62. The scanning device 42 receives from an activated erase OR gate 63 an erasure order pulse, due to which all address information intermediately stored in the auxiliary memory is immediately cancelled.

There is obtained that an erasure of the auxilary memory and a restart of the execution of the second sequence is carried out if a intermediately stored first category read instruction is encountered, where the associated address of this instruction agrees with the address associated with a write instruction which is selected during the execution of the first sequence. The erasure is required since the associated data processing unit has received data information from its separate memory due to the encountered first category instruction which the memory would not have received if attention had been consistently paid to the order determined in advance, i.e. if instructions in the first and second sequences had not been selected in parallel.

The intermediate storage unit includes a second NOR gate 64 with inputs connected to the above-mentioned identifying signal inputs 10 and 33 and with an inverting output connected to the OR gate 43. When the selections of the first and the second sequences are terminated, a scanning operation is consequently ordered, although the scanning is without result in the intermediate storage unit included in the data processing unit which has executed the first sequence. An eighth AND control gate 65 has its inputs connected to the NOR gates 48 and 64 and its output connected to erase OR gate 63. An erase order pulse is obtained when the scanning operation started by the NOR gate 64 is terminated.

During the last mentioned scanning operation the second sequence intermediate storage unit generates updating information which comprises all write addresses selected and intermediately stored during execution of the second sequence. The write markings read from the auxiliary memory bit positions 49 are received by a ninth AND control gate 66 which has its second input connected to NOR gate 64 and its output connected via an updating OR gate 67 to the above mentioned order terminal 39 of the updating unit 3. The updating addresses read from the auxiliary memory address bit positions 58 are transferred with the aid of a second AND gate device 68 which has its activating input connected to the output of the control gate 66, via an OR gate device 69, to the above mentioned order terminal 40 of the updating unit 3.

A tenth AND control gate 70 with its first input receiving the write markings intermediately stored in the bit positions 49 of the auxiliary memory has its second input connected to the output of the control gate 61 and its output constituting the above-mentioned updating output 13 connected to a third input of the stop OR gate 51. There is obtained that the scanning operation started by the activation of control gate 56 is stopped if duplication is determined by the second comparison circuit 60 between a write address selected during execution of the first sequence and one of the write addresses intermediate-stored in the auxiliary memory during execution of the second sequence.

The intermediate storage unit illustrated in FIG. 3 finally includes an eleventh AND control gate 71 which has its first input connected to the above-mentioned identifying signal input 31, and has its second input being activated by the rear flank of a pulse connected to the terminal 36, and has its third input being inverting and constituting the above-mentioned updating input 14, and which has its output connected to the updating OR gate 67 and to the activating input of a third AND gate device 72 with its input connected to the intermediate storage unit terminal 37 and its output connected to the OR gate device 69. The OR gate 67 and the OR gate device 69 of the intermediate storage unit assigned to the first sequence consquently transfer as updating information a write address selected during the execution of the first sequence and included in this sequence, unless this write address is intermediately stored in the auxiliary memory assigned to the second sequence.

For example, if data are written into a separate memory location accessible by the address A3 and assigned to the first sequence, it would be wrong then to update the second sequence separate memory since, according to what has been assumed above, this write address A3 has previously been intermediately stored in the second sequence auxiliary memory. On the other hand, if it is a question of updating due to a write instruction with the address A4 included in the first sequence, and if it has been assumed according to the above that this adress A4 has previously been intermediately stored in the second sequence auxiliary memory, partly as associated with a first category read instruction and partly as associated with a write instruction, then the contents of the auxiliary memory are erased when the read address A4 is encountered. The control gate 70 of the second sequence intermediate storage unit is therefore not activated, so that correct updating, in the manner described above, of the second sequence separate memory is carried out with the aid of the control gate 71 of the first sequence intermediate storage unit and while using the address A4.

According to a method for intermediately storing and updating not illustrated on the drawing, the first sequence write addresses and the second sequence write instructions, i.e. write addresses and associated data information, are intermediately stored in the respective auxiliary memory. The comparison between each of the intermediately stored write addresses associated with the first sequence and each of the intermediately stored read addresses associated with the second sequence is carried out in parallel with updating of the second sequence separate memory when the first sequence instruction selections are terminated, restarting of the second sequence execution being ordered due to address duplication determined on comparison. The updating of the separate memory associated with the first sequence is carried out with the aid of the intermediately write instructions associated with the second sequence when the second sequence instruction selection are terminated.

With the aid of the last-mentioned method for intermediately storing and updating, there is obtained an increase in the data processing capacity by means of the proposed execution of both sequences in parallel only if execution of the second sequence does not have to be restarted.

As an overall effect, there is achieved with the aid of the intermediate-storage units of the data processing units that the first and the second sequences are finally executed fault-free in the order determined in advance, in spite of the execution of both sequences having been initally ordered to be carried out in parallel.

We claim:

1. A method of operating computer means to enable the computer means to execute a first and a second instruction sequence, said computer means comprising an auxiliary memory means and a first and second memory for storing the first and second instruction sequences, each memory comprising a plurality of memory locations accessible by an address, execution of the first and second sequences including selection of at least one read instruction and selection of at least one write instruction, said at least one read instruction comprising a read address for retrieval of data stored in one of said memory locations each accessible by its address in said first and second memories, respectively, and said at least one write instruction comprising a write address and data, said write address specifying a memory location to which the data is to be transferred, wherein data used in conjunction with the execution of the second sequence is not necessarily independent of data obtained in conjunction with the execution of the first sequence, said method comprising the steps of:
executing instructions in both sequences independent of a predetermined order of execution of the sequences;
upon encountering a read instruction during the execution of the second sequence, storing the read address of said read instruction encountered during the execution of the second sequence in said auxiliary memory means, if this address has not previously been selected in conjunction with execution of a write instruction in the second sequence;
upon encountering a write instruction during the execution of the first sequence, comparing each read address stored in said auxiliary memory means and the address of said write instruction encountered during the execution of the first sequence; and
re-executing the instructions in the second sequence responsive to the comparing step if the address of said write instruction encountered during the execution of the first sequence is any read address stored in said auxiliary memory means.

2. A method according to claim 1, further comprising the steps of:
upon encountering a write instruction during the execution of the second sequence, storing the write address of said write instruction in said auxiliary memory means;
upon encountering a write instruction during the execution of the first sequence, comparing each write address stored in said auxiliary memory means and the write address of said write instruction encountered during the execution of the first sequence;
updating contents of said memory locations of the second memory in conjunction with every execution of a write instruction in the first sequence responsive to the step of comparing the write addresses, if the write address of said write instruction encountered during the execution of the first sequence is not equal to any write address stored in said auxiliary memory means; and
preventing an updating of said memory locations of the second memory responsive to the step of comparing each write address, if the write address of said write instruction encountered during the execution of the first sequence is equal to any write address stored in said auxiliary memory means.

3. An apparatus for executing a first and second instruction sequence, each of the first and second instruction sequences comprising at least one instruction, said first sequence being logically executable before said second sequence, wherein data used in conjunction with execution of said second sequence is not necessarily independent of data used in conjunction with the execution of said first sequence said apparatus comprising:
a first starting circuit for starting execution of said first sequence;
first and second instruction memory means for storing instructions of said first and second instruction sequences, respectively, and for selecting the stored instructions one at a time, said stored instructions comprising at least one read instruction and at least one write instruction;
first and second separate memory means connected to said first and second instruction memory means, respectively, and having at least one memory location for storing data to be read and written using read/write addresses selected from read/write address bit positions in the first and second instruction memory means;
updating means for updating contents of said at least one memory location of said first and second separate memory means responsive to a logical order of execution of the first and second instruction sequences and to selected write instructions;
a second starting circuit for starting execution of said second sequence, said second starting circuit having a first activating input connected to said first starting circuit and a second activating input;
auxiliary memory means comprising an input connected to said second instruction memory means, read address bit positions, means for identifying memory addresses accesses by the write instruction of said second sequence, means for determining whether memory addresses have previously been selected by the execution of a write instruction of said second sequence, and storing means responsive to said determining means for storing in said auxiliary memory means at least one address obtained from a read instruction selected during execution of said second sequence when said at least one address is not one of the memory addresses determined by said determining means to have been selected by the execution of the write instruction of said second sequence; comparing means for comparing two addresses, said means comprising at least one first comparison terminal connected to write address bit positions of said first instruction memory means for receiving the write addresses of the instructions of said first sequence, at least one second comparison terminal connected to read address bit positions of said auxiliary memory means for receiving the read addresses of the instructions of said second sequence stored therin, and an output for outputting a restart signal when said read address received at the at least one second comparison terminal is equal to any said write address received at the at least one first comparison terminal, said output connected to said second activating input of said second starting circuit for activating said second starting circuit to re-execute the instructions in said second sequence responsive to outputting said restart signal.

4. The apparatus according to claim 3, wherein said auxiliary memory means comprises write address bit positions for intermediately storing at least one address which was obtained from at least one write instruction selected during execution of said second sequence, said apparatus further comprising:

an updating comparison circuit comprising at least one first comparison terminal connected to the write address bit positions of said first instruction memory means, at least one second comparison terminal connected to said write address bit positions of said auxiliary memory means, and an output for outputting a first logical updating signal when the addresses received on said at least one first comparison terminal are unequal to the addresses received on said at least one second comparison terminal and for outputting a second logical updating signal when the addresses received on said at least one first comparison terminal are equal to the addresses received on said at least one second comparison terminal; and an updating control circuit which is activated and de-activated upon receiving, respectively, said first and said second logical updating signal, said control circuit comprising at least one input terminal connected to the write address bit positions of said first instruction memory means, and at least one output terminal connected to said updating means.

5. A method of operating a computer to enable the computer to execute a first and second instruction sequence, each instruction sequence having at least one read instruction and at least one write instruction, the at least one read and the at least one write instruction comprising an address and data, wherein data used in conjunction with execution of the second sequence is not necessarily independent of data obtained in conjunction with the execution of the first sequence, said method comprising the steps of:

storing the first sequence in a first memory in the computer and storing the second sequence in a second memory in the computer;

executing instructions in both sequences independent of a predetermined order of execution of the sequences;

upon encountering a read instruction during the execution of the second sequence, storing the address of said read instruction encountered during the execution of the second sequence in a separate memory in the computer, if this address has not previously been selected in conjunction with execution of a write instruction in the second sequence;

upon encountering a write instruction during the execution of the first sequence, comparing each address stored in the separate memory and the address of said write instruction encountered during the execution of the first sequence; and re-executing instructions in the second sequence responsive to the comparing step if the address of said write instruction encountered during the execution of the first sequence is equal to any address stored in the separate memory.

6. A method according to claim 5, further comprising the steps of:

upon encountering a write instruction during the execution of the second sequence, storing the address of said write instruction in the separate memory;

upon encountering a write instruction during the execution of the first sequence, comparing each address stored in the separate memory and the write address of said write instruction encountered during the execution of the first sequence;

updating the data stored in the second memory in conjunction with every execution of a write instruction in the first sequence responsive to the step of comparing each address, if the write address of said write instruction encountered during the execution of the first sequence is not equal to any address stored in the separate memory; and preventing an updating of the data stored in the second memory responsive to the step of comparing each address, if the write address of said write instruction encountered during the execution of the first sequence is equal to an address stored in the separate memory.

* * * * *